May 3, 1955     R. T. MULVANITY ET AL     2,707,528
APPARATUS FOR LUBRICATING ROLLER BEARINGS
Filed Dec. 4, 1951
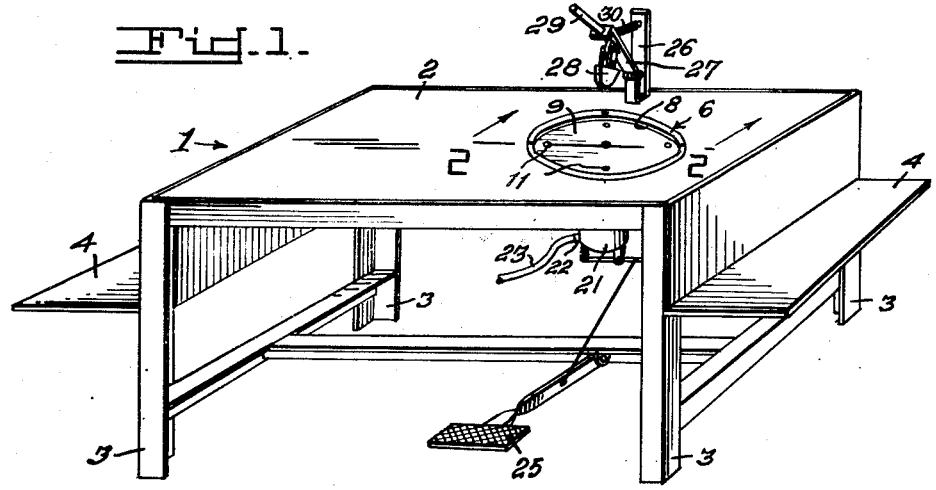
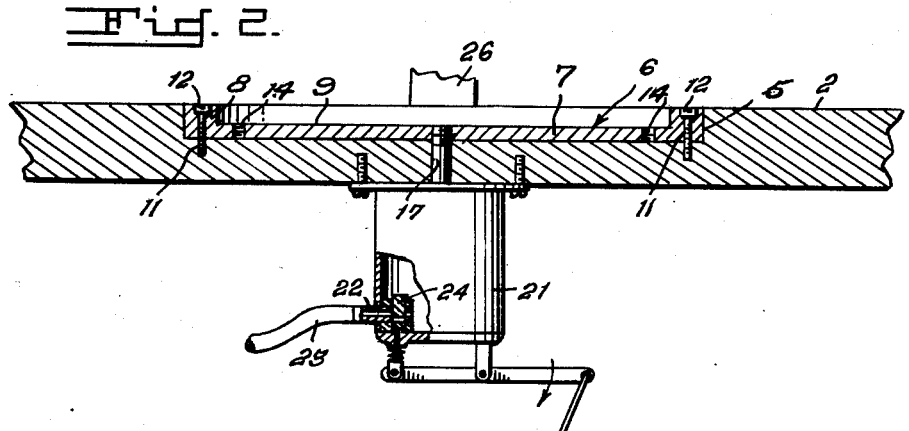
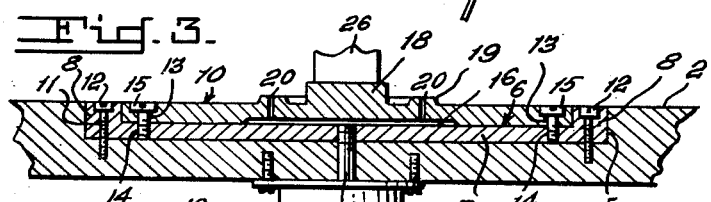
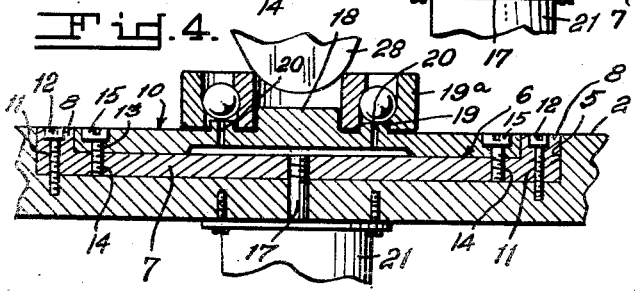
INVENTORS
Ralph T. Mulvanity
Olaf E. Freed
Albert R. Sabaroff

2,707,528

APPARATUS FOR LUBRICATING ROLLER BEARINGS

Ralph T. Mulvanity, Olaf E. Freed, and Albert R. Sabaroff, Richmond, Ky., assignors to the United States of America as represented by the Secretary of the Army Application December 4, 1951, Serial No. 259,876

9 Claims. (Cl. 184—1)

(Granted under Title 35, U. S. Code (1952), sec. 266)

The invention described herein may be manufactured and used by or for the Government for governmental purposes without the payment of any royalty thereon.

The present invention relates to apparatus for lubricating bearings.

Organizations, such as, for example, military establishments, utilizing large numbers of vehicles, must of a necessity procure great quantities of bearings for storage to be later used in assembly and repair. These bearings may be sealed or shielded ball bearings, or roller bearings of the straight or tapered kind, with either single or double row bearings. Preparatory to storing these bearings it has been found necessary to lubricate them with a combination preservative and lubricant in order to protect the bearings and to prevent weathering and corrosion. After lubrication the bearings are packed in plastic bags, cellophane wrappers, oiled paper, or boxes or the like, and stored.

Except for bearings having seals on both sides, which are usually filled with special lubricant by the bearing manufacturer, lubrication is done by the machine assembler, and the use of the commercial and well known type, Alemite grease gun, without more, has been found to be laborious, time consuming and extremely inefficient where large numbers of bearings need to be lubricated. Prior art apparatus developed for use with commercial type grease guns has been found to be expensive and extremely complex for this purpose.

It is therefore an object of this invention to provide a simple apparatus which, when combined with the commercial type grease gun, will enable bearings to be lubricated more efficiently and with less expense than in the prior art apparatus.

It is also a further object of this invention to provide a greasing table which is constructed and arranged to removably accommodate dies or grease distributing plates of various designs upon which may be fitted bearings of different sizes and shapes and of varying bore diameters.

With these and other objects in view which will become apparent as the following specifications develop, reference is made to the accompanying drawing which forms part of the specification and wherein like numerals have been used to designate similar or corresponding parts in the several figures, and wherein Figure 1 is a perspective view of the greasing table and apparatus to accommodate a bearing to be lubricated.

Figure 2 is a section taken on line 2—2 of Figure 1.

Figure 3 is a section similar to Figure 2 with a typical injector plate in place.

Figure 4 is a similar view showing a bearing in place ready to be lubricated.

Referring to the drawing, 1 represents a work table of convenient length having a surface 2 made of 2″ x 8″ planks, or metal, or the like, and legs 3 which may be angle irons. The table may also be provided with shelves 4 along the sides thereof for convenience in handling work pieces. The work table surface is provided with a circumferential well, or cavity, 5 of a depth approximately one half the thickness of a plank, well 5 being provided with a metallic liner, or grease distributor plate 6 of substantial thickness and having a hard wearing surface, such as chrome steel or any other suitable metal, so that it may easily be kept clean and free of dirt. The liner 6 comprises a flat plate secion 7 and a peripheral struck up wall 8, so as to closely fit well 5, the side wall and flat plate section forming circumferential cavity 9 to accommodate a die or lubricant injector plate 10. Peripheral wall 8 is provided with a plurality of equiangularly spaced holes 11 to receive counter-sunk screws 12 to removably secure the liner to the work table. When installed the wall of the liner presents a top surface which is flush with the flat of the table.

Lubricant injector plate 10, shown in Figures 3 and 4 is merely typical and may be altered in design, configuration and size to accommodate any size bearing desired. Plate 10 makes a comparatively snug fit in cavity 9 and is provided with vertical holes 13 alining with holes 14 in plate 6 to receive countersunk screws 15, so that the plate may be easily put in place, or removed when a different size bearing is to be lubricated. A shallow circumferential cavity 16 is formed in the under surface of plate 10 to receive a lubricant which travels by way of axial conduit 17 formed in the work table and in liner 6. The upper surface of plate 10 is provided with a substantially thick vertical walled circumferential flat surfaced boss 18 of a size to fit the bore of a bearing 19a superimposed thereon to be greased. It is to be understood however that the boss may have an upwardly tapering wall to snugly fit into the bore of a bearing to be lubricated. Radially removed from boss 18 and concentric therewith is a second annular boss 19 radially dimensioned to fit between the outer wall of the inner bearing race and the inner wall of the outer bearing race, and of a vertical height less than boss 18 to fit underneath the ball or roller bearings. The walls of boss 19 may be vertical, or sloped to provide a snug fit with the bearing races. A plurality of longitudinal or vertical bores 20, communicating with cavity 16 are provided in boss 19 to permit lubricant to gain access to the balls or rollers. A cylindrical reservoir 21 is secured in any convenient manner to the underside of the work table surface and is concentrically disposed with respect to the longitudinal axis of the cavity formed in the work table surface. The reservoir wall is provided with a nipple 22 adjacent the bottom so that it may accommodate flexible hose 23 which is connected to a grease supply or Alemite grease pump (not shown). The lubricant is fed into the reservoir under pneumatic pressure as is well known, and the entrance of grease under pressure into the reservoir is controlled by a valve 24, which may be a vertical sliding spring biased gate valve, controlled by a foot treadle 25 swingably fixed to a support member of the table.

In order to hold the bearing in place while it is being lubricated, a hand operated holding means is provided comprising a J-shaped upright 26 secured to the table surface and having a flat bar 27 pivotally connected to the short leg of the J, to which is fixedly mounted a downwardly directed downwardly tapering parabolic-shaped metal pad 28 adapted to engage the wall encompassing the bearing bore when lowered. The shape of this pad enables it to fit various size bearing bores for different size bearings. The pad is downwardly movable by means of a handle 29 connected thereto and is biased out of engagement with the bearing by a spring 30 connected to flat bar 27 and to the long upright of the J-support.

A cover or flat plate (not shown) may be provided large enough to fit over the bearing to be lubricated to confine the grease to the space between the bearing races.

This flat plate will be provided with a central hole coextensive with the bearing bore to accommodate the parabolic metal pad 28.

Numerous other modifications and alterations of the structure which has been disclosed herein for purposes of illustration will be apparent to one skilled in the art and it is obvious that the same may be made without departing from the spirit and scope of the invention as defined in the following claims.

We claim::

1. Apparatus for lubricating roller and ball bearings comprising, a work table having a circumferential well formed in the table surface, a grease distributor plate secured in and lining said well, said distributor plate having a circumferential cavity in its upper surface, an injector plate received in said distributor plate cavity, and having a circumferential cavity formed in its under surface, a vertical conduit in said work table and said distributor plate communicating at one end with said injector plate cavity and at the other end with a source of grease under air pressure, a first central boss formed in the top surface of said injector plate adapted to fit the bore of a bearing, a second boss radially removed from said first boss and concentric therewith adapted to be received in the space between the inner and outer races of said bearing, said injector plate having a plurality of vertical holes through said second boss and communicating with the cavity in said injector plate, foot operated valve means to control the flow of grease under air pressure through said conduit and said injector holes to pack the space between the races of a bearing to be lubricated, and means supported on said work table hand actuated to engage and hold in place a bearing to be lubricated.

2. The combination in claim 1 wherein said bearing holding means includes a downwardly tapering pad adapted to fit the bore of a bearing to be lubricated.

3. In a device for greasing bearings of the type having coaxial inner and outer races and interposed antifriction rolling members, a generally flat plate having a first boss upstanding from one side thereof to fit the inner race of a bearing and locate the same on said plate, a second annular boss upstanding from said side of the plate coaxially of said first boss, said second boss being constructed and arranged to fit between the races of a bearing positioned on said first boss, there being a series of circumferentially-spaced holes through said plate each opening through the upper surface of said second boss.

4. In a device as recited in claim 3 a second flat plate having a depression forming walls within which said first-named plate has a smooth fit, means securing said first-named plate within said walls, said first named plate having a circumferential depression in its lower face, said plates when so secured conjointly defining a cavity between their contiguous faces and in communication with said holes.

5. In a device as recited in claim 4 a pressure grease connection secured to said second plate in communication with said cavity.

6. Apparatus for lubricating roller and ball bearings comprising a work table having a circumferential well formed in its surface, a grease supply conduit in said work table connected to a source of lubrication under air pressure, lubrication injector means in said well having injection apertures connected with said grease supply conduit, said injector means comprising a generally flat plate received in said well and having a first upstanding boss adapted to fit the inner race of a bearing positioned thereupon, and a second annular upstanding boss coaxial with said first boss adapted to be received between the races of said bearing, said injection apertures extending vertically through said second boss.

7. The combination in claim 6 and including hand actuated means supported on said work table to engage and hold in place a bearing to be lubricated.

8. Apparatus for lubricating bearings comprising, a work table having a circumferential well formed in the table surface, a grease distributor plate snugly fitting said well, a grease injector plate superimposed on said distributor plate and having an upper surface configuration comprising a first central upstanding boss adapted to fit the bore of a bearing, a second boss radially removed from and concentric with said first boss and adapted to be received in the space between the inner and outer races of said bearing, there being a plurality of vertical injection apertures formed in said second boss and communicating with a grease supply under pressure whereby the bearing races may be packed with grease.

9. The combination in claim 8 and including hand actuated means supported on said work table to engage and hold in place a bearing to be lubricated.

References Cited in the file of this patent

UNITED STATES PATENTS

| 2,140,909 | Green | Dec. 20, 1938 |
| 2,168,746 | Saal | Aug. 8, 1939 |

FOREIGN PATENTS

| 906,794 | France | May 28, 1945 |